United States Patent
Ideshio et al.

(10) Patent No.: US 9,457,667 B2
(45) Date of Patent: Oct. 4, 2016

(54) VEHICLE CONTROL DEVICE

(75) Inventors: Yukihiko Ideshio, Nissin (JP); Terufumi Miyazaki, Toyota (JP); Yuji Inoue, Nissin (JP); Shingo Eto, Gamagori (JP); Yousuke Michikoshi, Miyoshi (JP); Akihiro Sato, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/364,713

(22) PCT Filed: Dec. 14, 2011

(86) PCT No.: PCT/JP2011/078926
§ 371 (c)(1),
(2), (4) Date: Jun. 12, 2014

(87) PCT Pub. No.: WO2013/088530
PCT Pub. Date: Jun. 20, 2013

(65) Prior Publication Data
US 2014/0336893 A1    Nov. 13, 2014

(51) Int. Cl.
*B60L 7/18* (2006.01)
*B60K 6/445* (2007.10)
*B60K 6/48* (2007.10)
(Continued)

(52) U.S. Cl.
CPC .............. *B60L 7/18* (2013.01); *B60K 6/445* (2013.01); *B60K 6/48* (2013.01); *B60L 7/20* (2013.01); *B60W 10/08* (2013.01); *B60W 20/14* (2016.01); *B60W 30/18136* (2013.01);
(Continued)

(58) Field of Classification Search
CPC .............. B60W 10/08; B60W 20/00; B60W 2530/10; B60W 30/18127; B60W 2300/14; B60W 2300/145; B60W 40/13; B60W 20/14; B60W 30/18136; B60L 2240/26; B60L 7/10; B60L 7/18; B60L 7/20; B60T 8/18; B60K 6/48; B60K 6/445
USPC ............................................ 701/70; 903/947
See application file for complete search history.

(56) References Cited

U.S. PATENT DOCUMENTS 5,915,801 A * 6/1999 Taga ................... B60K 6/48
303/152
5,927,415 A * 7/1999 Ibaraki ................. B60K 6/48
180/65.25
(Continued)

FOREIGN PATENT DOCUMENTS

CN      101024397 A     8/2007
JP      2000-282908 A   10/2000
(Continued)

*Primary Examiner* — Jason Holloway
(74) *Attorney, Agent, or Firm* — Dinsmore & Shohl LLP

(57) ABSTRACT

A vehicle control device includes: an engine and a first motor generator from both of which a driving force for traveling is output to drive wheels; and an electricity storage device that storages electric power for driving the first motor generator. When a vehicle weight is in a reference state at a time of deceleration braking, the first motor generator is mainly caused, out of the first motor generator and the engine, to generate a braking force, and when the vehicle weight is greater than that in the reference state, the engine is mainly caused, out of the first motor generator and the engine, to generate the braking force. Thus, a sufficient braking force can be obtained while an input limit of the electricity storage device is prevented from being reached.

2 Claims, 9 Drawing Sheets

(51) Int. Cl.
*B60W 10/08* (2006.01)
*B60W 30/18* (2012.01)
*B60L 7/20* (2006.01)

(52) U.S. Cl.
CPC ........ *Y02T 10/6221* (2013.01); *Y02T 10/6239* (2013.01); *Y10S 903/947* (2013.01)

(56) References Cited

U.S. PATENT DOCUMENTS

| | | | | |
|---|---|---|---|---|
| 6,571,165 | B2* | 5/2003 | Maruko | B60K 31/0008 340/435 |
| 8,068,019 | B2* | 11/2011 | Bennie | B60C 23/009 307/9.1 |
| 8,602,142 | B2* | 12/2013 | Books | B60T 1/10 180/65.1 |
| 2006/0287798 | A1* | 12/2006 | Inoue | B60L 15/2072 701/70 |
| 2008/0314658 | A1* | 12/2008 | Atarashi | B60K 6/445 180/65.25 |
| 2013/0146374 | A1* | 6/2013 | Books | B60T 1/10 180/65.21 |
| 2013/0166182 | A1* | 6/2013 | Suzuki | B60L 7/14 701/110 |
| 2015/0105213 | A1* | 4/2015 | Wright | B60W 20/108 477/3 |

FOREIGN PATENT DOCUMENTS

| | | |
|---|---|---|
| JP | 2003-125501 A | 4/2003 |
| JP | 2007-223421 A | 9/2007 |
| JP | 2009-041599 A | 2/2009 |
| JP | 2009-171727 A | 7/2009 |
| JP | 2009-255916 A | 11/2009 |

* cited by examiner

VEHICLE CONTROL DEVICE

TECHNICAL FIELD

The present invention relates to a vehicle control device that includes an engine and a motor generator.

BACKGROUND ART

Conventionally, a hybrid vehicle is known, which includes: an engine and a motor generator from both of which a driving force for traveling is output to drive wheels; and a battery that stores electric power for driving the motor generator (for example, see Patent Literature 1).

The hybrid vehicle of Patent Literature 1 can travel by only the driving force of the engine, and also can travel by an integrated driving force of the engine and the motor generator. Furthermore, in this hybrid vehicle, when deceleration braking is carried out, a regenerative braking force is output due to the motor generator that generates electric power. At this time, the electric power generated by the motor generator is stored in the battery.

Here, in general, when a weight of the vehicle (hereinafter referred to as the "vehicle weight") weight is greater than that in a reference state, a large braking force is required compared to when the vehicle weight is in the reference state, due to a large inertial force at the time of the deceleration braking. The vehicle weight in the reference state means, for example, that no towed object (e.g. trailer) is connected to the vehicle or no cargo and the like is loaded on the vehicle. The vehicle weight greater than that in the reference state means, for example, that a towed object is connected to the vehicle or cargo is loaded on the vehicle.

In the hybrid vehicle of Patent Literature 1, at the time of the deceleration braking in a loading state (the vehicle weight greater than that in the reference state), the regenerative braking force is increased by increasing the electric power generated by the motor generator. Thus, degradation of drivability is suppressed while energy efficiency is improved.

CITATION LIST

Patent Literature

[Patent Literature 1] JP 2009-171727 A

SUMMARY OF INVENTION

Technical Problem

However, in the conventional hybrid vehicle disclosed in Patent Literature 1, an input limit of the battery may be reached by increasing the electric power generated by the motor generator. When the input limit of the battery is reached, it is not possible to increase the regenerative braking force. Thus, the sufficient braking force cannot be obtained and the drivability is degraded.

The present invention was made to resolve the above-described problem, and an object of the present invention is to provide a vehicle control device capable of obtaining the sufficient braking force while preventing the input limit of the electricity storage device from being reached.

Solutions to the Problems

A vehicle control device in the present invention includes: an engine and a first motor generator from both of which a driving force for traveling is output to drive wheels; and an electricity storage device that storages electric power for driving the first motor generator. In the present invention, when a vehicle weight is in a reference state at a time of deceleration braking, the first motor generator is mainly caused, out of the first motor generator and the engine, to generate a braking force, and when the vehicle weight is greater than that in the reference state, the engine is mainly caused, out of the first motor generator and the engine, to generate the braking force. To cause mainly the first motor generator out of the first motor generator and the engine to generate the braking force means that at least the first motor generator out of the first motor generator and the engine is caused to generate the braking force. To cause mainly the engine out of the first motor generator and the engine to generate the braking force means that at least the engine out of the first motor generator and the engine is caused to generate the braking force.

With the above configuration, when the vehicle weight is greater than that in the reference state, it is possible, by outputting the braking force by engine brake, to obtain a sufficient braking force while preventing the electric power generated by the first motor generator from reaching the input limit of the electricity storage device.

In the above-described vehicle control device, when the vehicle weight is greater than that in the reference state, the braking force by the first motor generator may be small compared to when the vehicle weight is in the reference state.

With the above configuration, when a large braking force is continuously required due to the vehicle weight grater than that in the reference state, a heat load of the first motor generator can be reduced by making the braking force by the first motor generator smaller (reducing the maximum value). Thus, it is possible to avoid the heat limit of the first motor generator, thereby suppressing degradation of drivability.

In the above-described vehicle control device, the vehicle may include a clutch disposed between the engine and the first motor generator, and when the vehicle weight is greater than that in the reference state, the clutch may be engaged so as to generate the braking force by the engine brake.

With the above configuration, in the vehicle in which the clutch is disposed between the engine and the first motor generator, it is possible to obtain the sufficient braking force while preventing the input limit of the electricity storage device from being reached.

In the above-described vehicle control device, the vehicle may include: a second motor generator that can perform motoring of the engine; and a power split mechanism that splits and transmits power of the engine to the second motor generator and the drive wheels, and when the vehicle weight is greater than that in the reference state, the motoring of the engine may be performed by the second motor generator so as to generate the braking force by the engine brake.

With the above configuration, in the vehicle including the power split mechanism, it is possible to obtain the sufficient braking force while preventing the input limit of the electricity storage device from being reached.

In the above-described vehicle control device, a towing state of the vehicle may be included where the vehicle weight is greater than that in the reference state, and a non-towing state of the vehicle may be included where the vehicle weight is in the reference state.

With the above configuration, when the vehicle is in the towing state, it is possible to obtain the sufficient braking force while preventing the input limit of the electricity storage device from being reached.

Advantageous Effects of Invention

With the vehicle control device of the present invention, it is possible to obtain the sufficient braking force while preventing the input limit of the electricity storage device from being reached.

DESCRIPTION OF EMBODIMENTS

Hereinafter, specific embodiments of the present invention will be described with reference to the drawings.

First Embodiment

-Mechanical Configuration-

First, a description will be given, with reference to FIG. 1, on a mechanical configuration (drive mechanism) of a hybrid vehicle 100 with an ECU 11 according to a first embodiment of the present invention.

Figure 1:
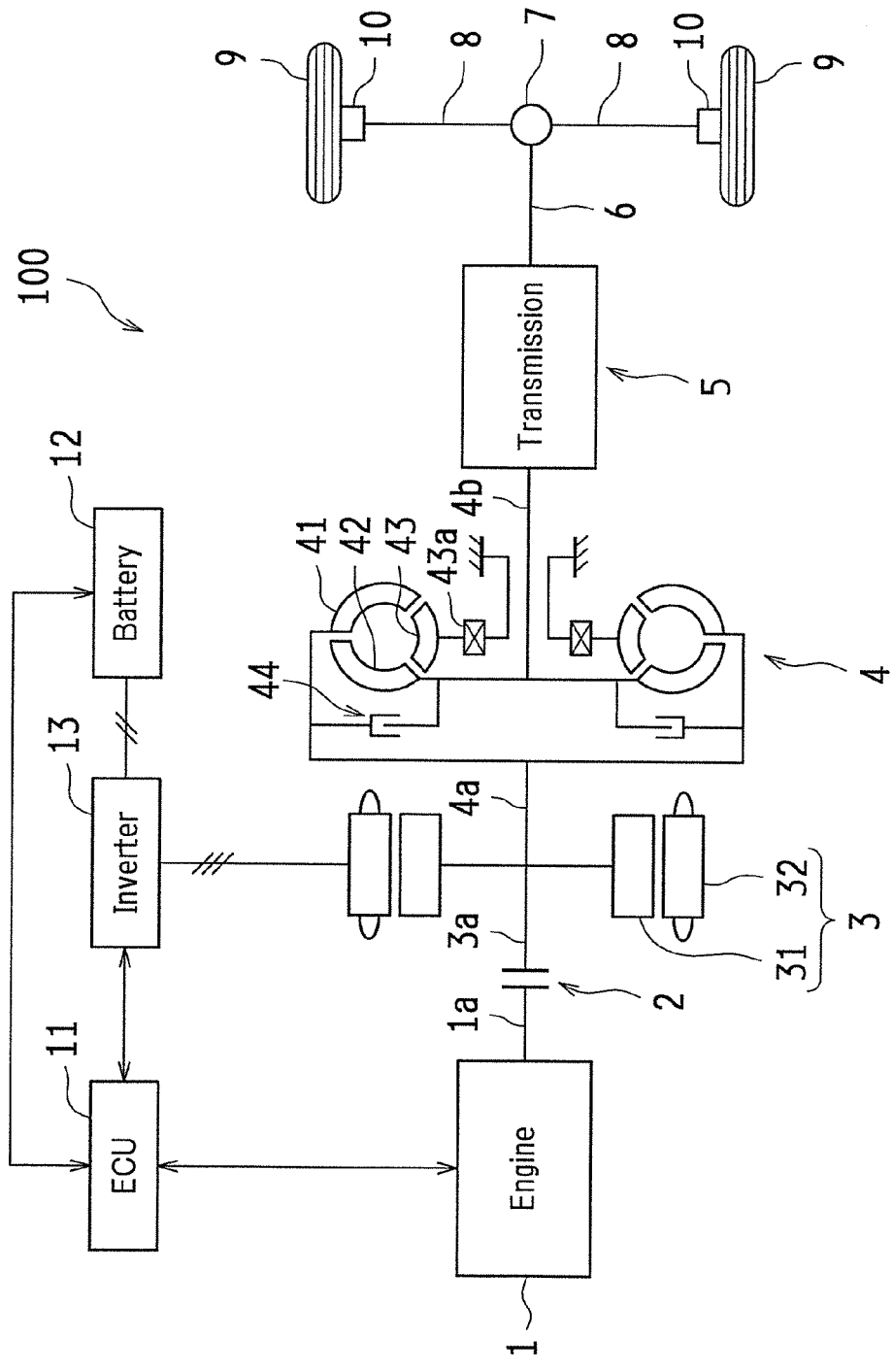
FIG. 1 is a schematic diagram showing an entire configuration of a hybrid vehicle with an ECU according to a first embodiment of the present invention.

As shown in FIG. 1, the hybrid vehicle 100 includes an engine (internal combustion engine) 1, a clutch 2, a motor generator 3, a torque converter 4 and a transmission 5.

The engine 1 is a known power device that outputs a driving force by burning fuel, such as a gasoline engine and a diesel engine. The engine 1 can control operating states of, for example, an opening degree of a throttle valve provided in an intake path (intake air amount), a fuel injection amount and an ignition timing. The engine 1 can output the driving force for traveling to drive wheels (for example, rear wheels) 9. The output of the engine 1 is transmitted to the clutch 2 via a crankshaft 1a.

The clutch 2 is, for example, a friction-type power transmission device, which is disposed between the engine 1 and the motor generator 3. The clutch 2 can transmit power between the engine 1 and the motor generator 3 by engaging the crankshaft 1a of the engine 1 with a rotating shaft 3a of the motor generator 3. Also, the clutch 2 can block the power between the engine 1 and the motor generator 3 by disengaging the crankshaft 1a from the rotating shaft 3a.

The motor generator 3 functions not only as a motor but also as a generator. The motor generator 3 is, for example, an AC synchronous motor, which has a rotor 31 made of a permanent magnet and a stator 32 on which a three-phase winding is wound. The rotor 31 and the rotating shaft 3a are integrally provided. The clutch 2 and the torque converter 4 are connected to the rotating shaft 3a.

The motor generator 3 can output the driving force for traveling to the drive wheels 9, and can output a braking force by generating electric energy converted from kinetic energy (rotation of the rotor 31). The motor generator 3 also functions as a starter motor when the engine 1 is started.

The torque converter 4 has a function to increase torque that is input to an input shaft 4a so as to output the torque to an output shaft 4b. The torque converter 4 includes a pump impeller 41 connected to the input shaft 4a, a turbine liner 42 connected to the output shaft 4b, a stator 43 for increasing the torque and a lock-up mechanism 44 for directly connecting the input shaft 4a to the output shaft 4b. In the torque converter 4, the rotating shaft 3a of the motor generator 3 is connected to the input shaft 4a, and an input shaft of the transmission 5 is connected to the output shaft 4b.

The pump impeller 41 delivers fluid (oil) to the turbine liner 42 when it is rotated. Then, the turbine liner 42 is rotated by the fluid delivered from the pump impeller 41. When a difference in the rotational speed is large between the pump impeller 41 and the turbine liner 42, the stator 43 rectifies the fluid returned from the turbine liner 42 to the pump impeller 41, and supports the rotation of the pump impeller 41 by the rectified fluid. When the difference in the rotational speed is small between the pump impeller 41 and the turbine liner 42, the stator 43 is rotated together with the turbine liner 42 by a one-way clutch 43a. The lock-up mechanism 44 is provided so as to directly connect input shaft 4a to the output shaft 4b and thus reduce decrease of transmission efficiency.

The transmission 5 is, for example, a multistage automatic transmission, which has a function to shift the rotational speed input to the input shaft so as to output the shifted rotational speed to the output shaft. The output from the transmission 5 is transmitted to the drive wheels 9 via a propeller shaft 6, a differential device 7 and drive shafts 8. The transmission 5 may be a continuously variable automatic transmission, or may be a manual transmission.

The hybrid vehicle 100 includes a hydraulic braking device 10 in a vicinity of each of the drive wheels 9. The braking device 10 includes, for example, a disc rotor that is rotated together with the drive shaft 8 (drive wheel 9) and a brake caliper having brake pads. In the braking device 10, the brake pads are driven by a brake actuator to sandwich the disc rotor, thus the braking force is generated.

—Electrical Configuration—

Next, a description will be given on an electrical configuration of the hybrid vehicle 100 according to the first embodiment with reference to FIGS. 1 and 2.

As shown in FIG. 1, the hybrid vehicle 100 includes the ECU (Electronic Control Unit) 11, a battery 12 and an inverter 13.

The ECU 11 controls the hybrid vehicle 100. The ECU 11 controls traveling of the hybrid vehicle 100 by executing various types of control including, for example, operation control of the engine 1, drive control of the motor generator 3 and cooperative control of the engine 1 and the motor generator 3. The ECU 11 is one example of the "control device" of the present invention.

Figure 2:
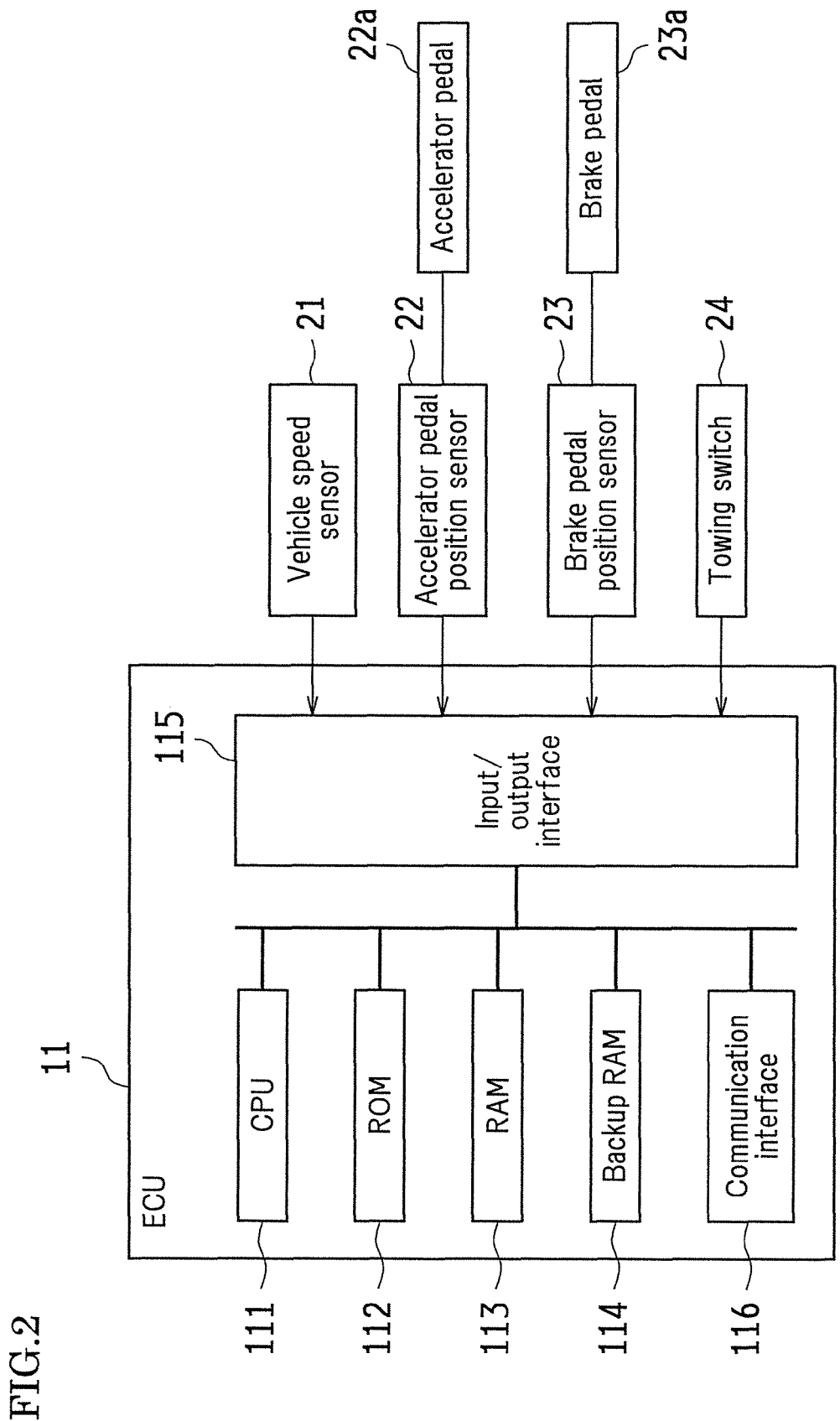
FIG. 2 is a block diagram showing the ECU of the hybrid vehicle of FIG. 1.

As shown in FIG. 2, the ECU 11 includes a CPU (Central Processing Unit) 111, a ROM (Read Only Memory) 112, a RAM (Random Access Memory) 113, a backup RAM 114, an input/output interface 115 and a communication interface 116.

The CPU 111 executes calculation processing based on various control programs and maps stored in the ROM 112. The ROM 112 stores the various control programs and the maps to be referred to when executing the various control programs. The RAM 113 is a memory for temporary storing calculation results by the CPU 111 and detection results by respective sensors. The backup RAM 114 is a nonvolatile memory for storing data to be stored when an ignition is turned off.

To the input/output interface 115 are input the detection results of the respective sensors. The input/output interface 115 also has a function to output control signals to respective units. To the input/output interface 115 are connected, for example, a vehicle speed sensor 21, an accelerator pedal position sensor 22, a brake pedal position sensor 23 and a towing switch 24.

The vehicle speed sensor 21 is a sensor to detect the vehicle speed of the hybrid vehicle 100. The accelerator pedal position sensor 22 is a sensor to detect a stepping amount of an accelerator pedal 22a. The brake pedal position sensor 23 is a sensor to detect a stepping amount of a brake pedal 23a.

The towing switch 24 is provided to switch the state of the hybrid vehicle 100 between a normal state in which there is no towed object (e.g. trailer) and a towing state in which there is a towed object. That is, the towing switch 24 is provided to switch the state of the weight of the hybrid vehicle 100 (hereinafter referred to as the "vehicle weight") between a reference state (normal state) and a state greater than the reference state (towing state).

The towing switch 24 can be operated by a driver. That is, in the hybrid vehicle 100, the normal state and the towing state can be switched based on the operation by the driver. In the towing state, for example, a shift timing of the transmission 5 is different from that in the normal state so as to suppress degradation of drivability caused by increase of running resistance by the towed object.

The battery 12 (see FIG. 1) includes a battery module that is a high voltage power supply for traveling, a battery monitoring unit for monitoring the battery module and a system main relay for connecting/disconnecting the battery module and the inverter 13. The battery 12 is one example of the "electricity storage device" of the present invention.

The battery module of the battery 12 supplies electric power to drive the motor generator 3, and stores electric power generated by the motor generator 3. The battery module is, for example, a nickel-metal-hybrid battery or a lithium-ion battery capable of charge/discharge.

To the battery monitoring unit is connected a sensor that detects a charge/discharge current, a voltage and a temperature (battery temperature) of the battery module. The battery monitoring unit transmits information on the battery module (the charge/discharge current, the voltage and the battery temperature) to the ECU 11. In this way, the ECU 11 calculates, for example, a SOC (State of Charge) of the battery module based on an integrated value of the charge/discharge current, and calculates an input limit Win and an output limit Wout based on the SOC and the battery temperature.

The inverter 13 (see FIG. 1) is, for example, a three-phase bridge circuit having an IGBT and a diode. The inverter 13 performs regenerative control or power running control in such a way that on/off of the IGBT is controlled according to a drive signal supplied from the ECU 11.

Specifically, the inverter 13 drives the motor generator 3 by converting direct current supplied from the battery 12 into alternating current (power running control). And when regenerative braking is carried out, the inverter 13 outputs direct current to the battery 12 by converting alternating current generated by the motor generator 3 into direct current (regenerative control).

—Traveling State—

Next, a description will be given on one example of the traveling state of the hybrid vehicle 100 according to the first embodiment.

For example, the hybrid vehicle 100 can travel using only the driving force of the engine 1 in such a way that the engine 1 is driven with the clutch 2 being engaged.

While the engine 1 is driven with the clutch 2 being engaged, the hybrid vehicle 100 can also travel using an integrated driving force of the engine 1 and the motor generator 3 by outputting the driving force for traveling from the motor generator 3. Also, while the engine 1 is driven with the clutch 2 being engaged, the hybrid vehicle 100 can make the motor generator 3 generate electric power by the driving force of the engine 1.

While the engine 1 is stopped with the clutch 2 being disengaged, the hybrid vehicle 100 can also travel using only the driving force of the motor generator 3 (EV traveling) by outputting the driving force from the motor generator 3.

Thus, in the hybrid vehicle 100, an intermittent operation of the engine 1 can be performed according to the traveling state and the like.

—Operations at Time of Deceleration Braking when Vehicle Travels—

Figure 3:
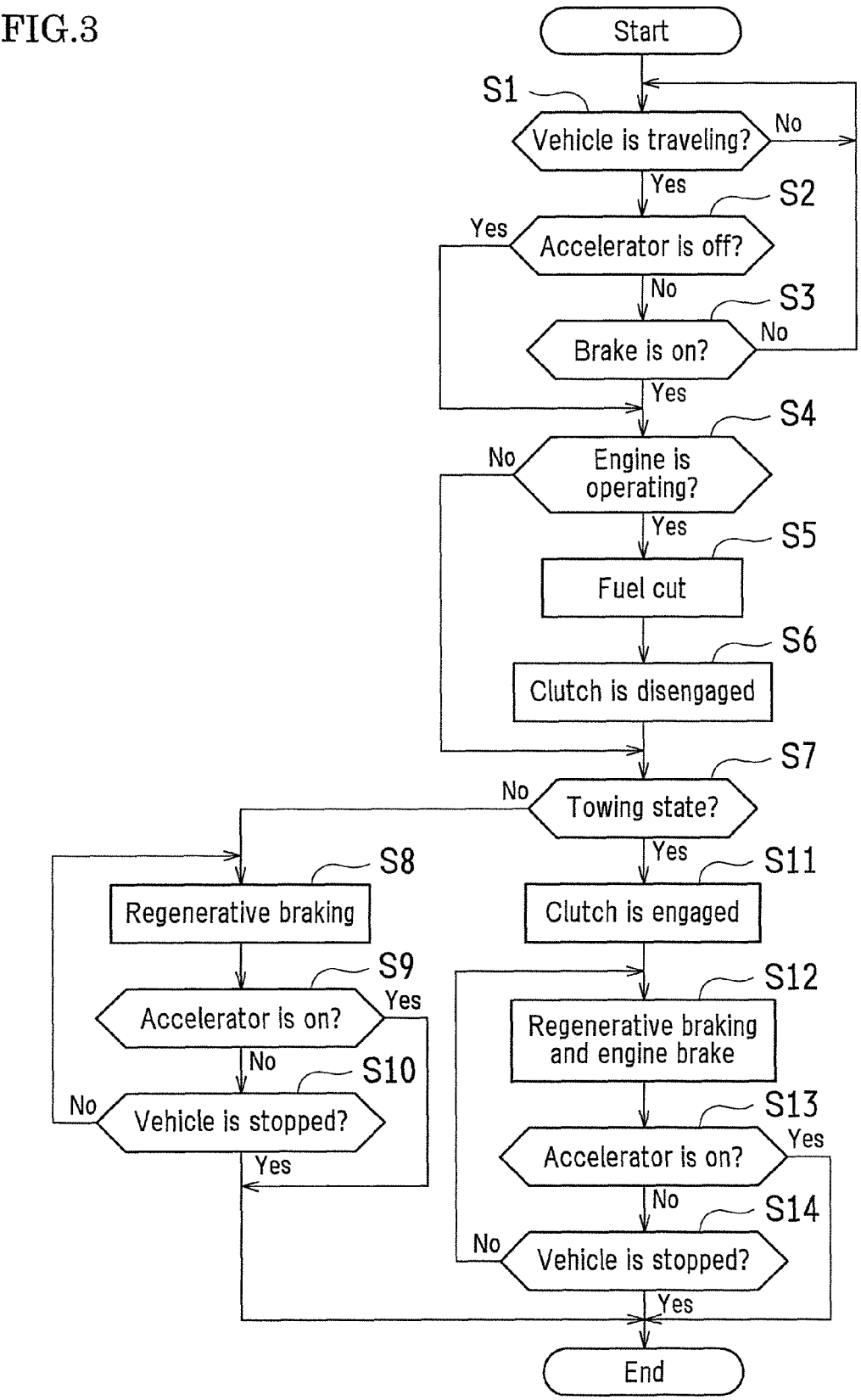
FIG. 3 is a flowchart explaining operations at the time of deceleration braking when the hybrid vehicle of FIG. 1 travels.

Next, a description will be given, with reference to the FIG. 3, on operations of the hybrid vehicle 100 at the time of deceleration braking when the hybrid vehicle 100 travels according to the first embodiment. A series of operations described below is repeatedly performed while the vehicle system is active. Also, respective steps described below are executed by the ECU 11.

In step S1, it is determined whether the hybrid vehicle 100 is traveling or not based on the detection result of the vehicle speed sensor 21. If it is determined that the hybrid vehicle 100 is traveling, the procedure advances to step S2. On the other hand, if it is determined that the hybrid vehicle 100 is not traveling, step S1 is repeatedly performed.

In step S2, it is determined whether the accelerator pedal 22a is off or not based on the detection result of the accelerator pedal position sensor 22. If it is determined that the accelerator pedal 22a is not off (the accelerator pedal 22a is in the on state), the procedure advances to step S3. On the other hand, if it is determined that the accelerator pedal 22a is off, the deceleration braking is started and the procedure advances to step S4.

In step S3, it is determined whether the brake pedal 23a is on or not based on the detection result of the brake pedal position sensor 23. If it is determined that the brake pedal 23a is on, the deceleration braking is started and the procedure advances to step S4. On the other hand, if it is determined that the brake pedal 23a is not on (the brake pedal 23a is in the off state), the deceleration braking is not started and the procedure returns to step S1.

In step S4, it is determined whether the engine 1 is being operated or not. If it is determined that the engine 1 is being operated, the procedure advances to step S5. On the other hand, if it is determined that the engine 1 is being stopped, the clutch 2 is being disengaged and the procedure advances to step S7.

In step S5, the fuel supply to the engine 1 is stopped (fuel cut). In this way, a self-sustained operation of the engine 1 is stopped. Then, in step S6, the clutch 2 is disengaged and power transmission between the engine 1 and the motor generator 3 is cut off.

In step S7, it is determined whether the hybrid vehicle 100 is towing a towed object or not. Such a towing state is determined based on, for example, a signal from the towing switch 24. If it is determined that the hybrid vehicle 100 is not in the towing state (is in the normal state), the vehicle weight is in the reference state, thus the procedure advances to step S8. On the other hand, if it is determined that the hybrid vehicle 100 is in the towing state, the vehicle weight is greater than that in the reference state, thus the procedure advances to step S11.

When the hybrid vehicle 100 is in the normal state (is not in the towing state), the motor generator 3 is subjected to the regenerative control in step S8. Specifically, the motor generator 3 generates electric power, thus the braking force is output. At this time, since the clutch 2 is being disengaged and rotation of the engine 1 is being stopped, a braking force by engine brake is not generated. The generated electric power is converted from alternating current into direct current by the inverter 13 so as to be charged in the battery module of the buttery 12.

In step S9, it is determined whether the accelerator pedal 22a is on or not based on the detection result of the accelerator pedal position sensor 22. If it is determined that the accelerator pedal 22a is not on (the accelerator pedal 22a is in the off state), the procedure advances to step S10. On the other hand, if it is determined that the accelerator pedal 22a is on, the series of operations at the time of the deceleration braking is terminated.

In step S10, it is determined whether the traveling of the hybrid vehicle 100 is stopped or not based on the detection result of the vehicle speed sensor 21. If it is determined that the traveling is stopped, the series of operations at the time of the deceleration braking is terminated. On the other hand, if it is determined that the traveling is not stopped, the procedure returns to step S8.

If the hybrid vehicle 100 is the towing state, the clutch 2 is engaged in step S11. Then, in step S12, the motor generator 3 is subjected to the regenerative control, and furthermore the engine 1 is co-rotated due to the clutch 2 being engaged, thus the engine brake functions. That is, because of the vehicle weight greater than that in the reference state, when an inertial force is large at the time of the deceleration braking, the braking force by the engine brake is output in addition to a regenerative braking force by the motor generator 3. Note that the maximum value of the regenerative braking force by the motor generator 3 (e.g. 100 Nm) at this time may be smaller than the maximum value of the above-described regenerative braking force in step S8 (e.g. 150 Nm).

In step S13, it is determined whether the accelerator pedal 22a is on or not based on the detection result of the accelerator pedal position sensor 22. If it is determined that the accelerator pedal 22a is not on (the accelerator pedal 22a is in the off state), the procedure advances to step S14. On the other hand, if it is determined that the accelerator pedal 22a is on, the series of operations at the time of the deceleration braking is terminated.

In step S14, it is determined that the traveling of the hybrid vehicle 100 is stopped or not based on the detection result of the vehicle speed sensor 21. If it is determined that the traveling is stopped, the series of operations at the time of the deceleration braking is terminated. On the other hand, if it is determined that the traveling is not stopped, the procedure returns to step S12.

—Effects—

As described above, in the first embodiment, when a large braking force is required at the time of the deceleration braking because of the hybrid vehicle 100 being in the towing state and having the vehicle weight greater than that in the reference state, the braking force is generated by the engine brake while the regenerative braking force is generated by the motor generator 3, thus part of the required braking force can be borne by the engine brake. In this way, a sufficient braking force can be obtained while the electric power generated by the motor generator 3 is prevented from reaching the input limit Win of the battery module of the battery 12. Thereby, even if the vehicle weight is great, it is possible to suppress degradation of drivability due to lack of the braking force.

Also, in the first embodiment, the clutch 2 is provided between the engine 1 and the motor generator 3. Thus, the braking force by the engine brake can be output by engaging the clutch 2.

Furthermore, in the first embodiment, the regenerative braking force in the towing state is smaller than the regenerative braking force in the non-towing state. In this way, when a large braking force is continuously required in a state such as the towing state, a heat load of the motor generator 3 can be reduced by making the braking force by the motor generator 3 smaller (reducing the maximum value). Thus, it is possible to avoid the heat limit of the motor generator 3, thereby suppressing degradation of drivability.

Second Embodiment

-Mechanical Configuration-

Next, a description will be given, with reference to FIG. 4, on a mechanical configuration (drive mechanism) of a hybrid vehicle 200 with an ECU 71 according to a second embodiment of the present invention. Note that the hybrid vehicle 200 according to the second embodiment is a so-called split type hybrid vehicle, which differs from the first embodiment.

Figure 4:
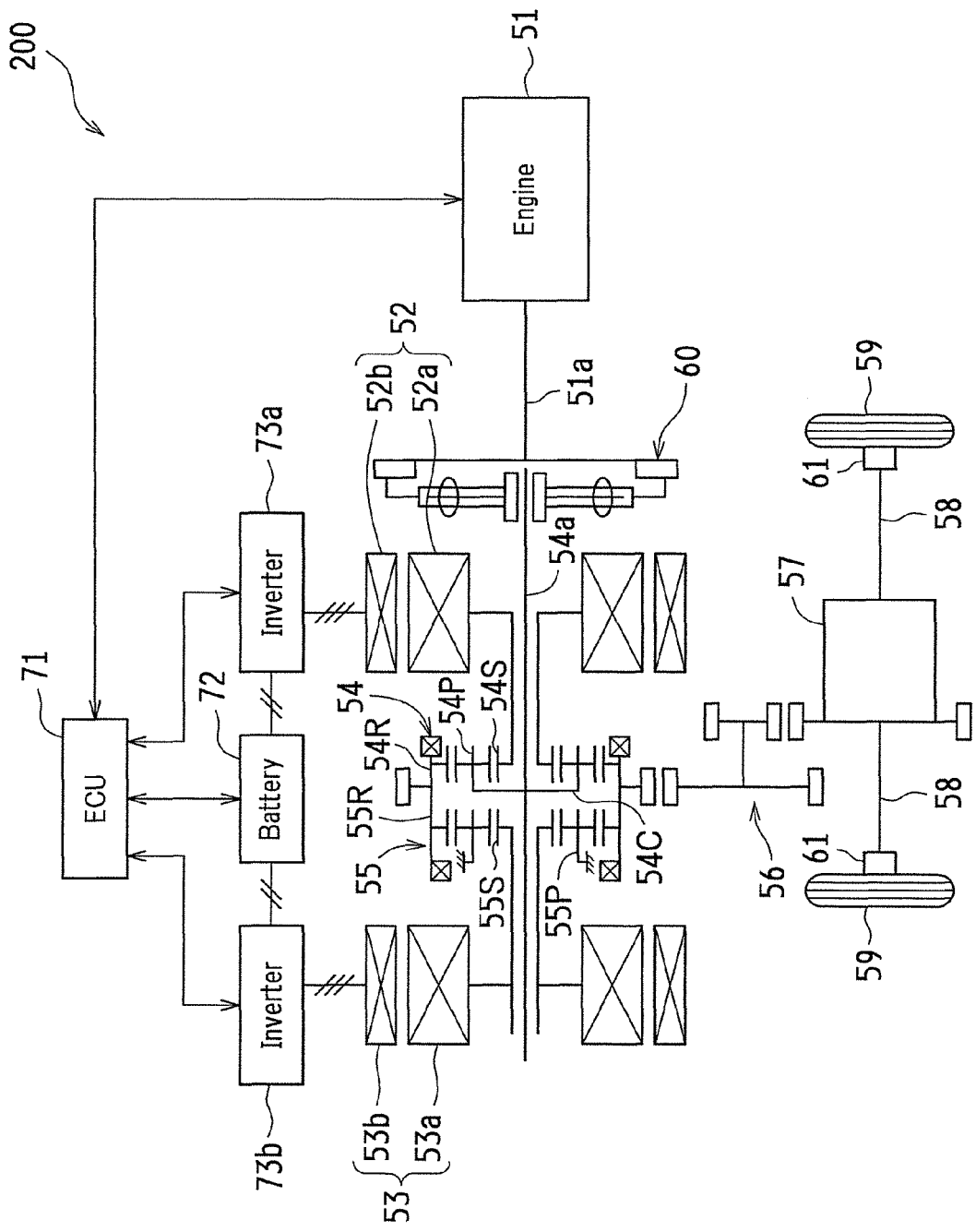
FIG. 4 is a schematic diagram showing an entire configuration of a hybrid vehicle with an ECU according to a second embodiment of the present invention.

As shown in FIG. 4, the hybrid vehicle 200 includes an engine (internal combustion engine) 51, a generator 52, a motor 53, a power split mechanism 54 and a reduction mechanism 55.

Output from the engine 51 is transmitted to an input shaft 54a of a power split mechanism 54 via a crankshaft 51a and a damper 60. The damper 60 is, for example, a coil spring type transaxle damper, which absorbs torque fluctuation of the engine 51. The other configurations of the engine 51 are the same as those of the above-described engine 1.

The generator 52 functions mainly as a generator, but functions as a motor according to circumstances. The generator 52 is, for example, an AC synchronous generator, which has a rotor 52a made of a permanent magnet rotatably supported by the input shaft 54a, and a stator 52b on which a three-phase winding is wound. The generator 52 also functions as a starter motor when the engine 51 is started. The generator 52 is one example of the "second motor generator" of the present invention.

The motor 53 functions mainly as a motor, but functions as a generator according to circumstances. The motor 53 is, for example, an AC synchronous motor, which has a rotor 53a made of a permanent magnet and stator 53b on which a three-phase winding is wound. The motor 53 is one example of the "first motor generator" of the present invention.

The power split mechanism 54 is a mechanism to split output of the engine 51 between power for driving drive wheels (for example, front wheels) 59 and power for driving the generator 52 to generate electric power, which is, for example, a planetary gear mechanism.

Specifically, the power split mechanism 54 includes: a sun gear 54S with outer teeth that rotates at a center of a plurality of gear elements; pinion gears 54P with outer teeth that are circumscribed (engaged) with the sun gear 54S and rotate and revolve around the sun gear 54S; a ring gear 54R with inner teeth that is formed in a ring shape so as to engage with the pinion gears 54P; and a planetary carrier 54C that supports the pinion gears 54P and rotates by the revolution of the pinion gears 54P.

The planetary carrier 54C is integrally rotatably connected to the input shaft 54a on the side of the engine 51. The sun gear 54S is integrally rotatably connected to the rotor 52a of the generator 52. Power of the ring gear 54R is transmitted to the drive wheels 59 via a reduction gear 56, a differential device 57 and drive shafts 58.

Figure 5:
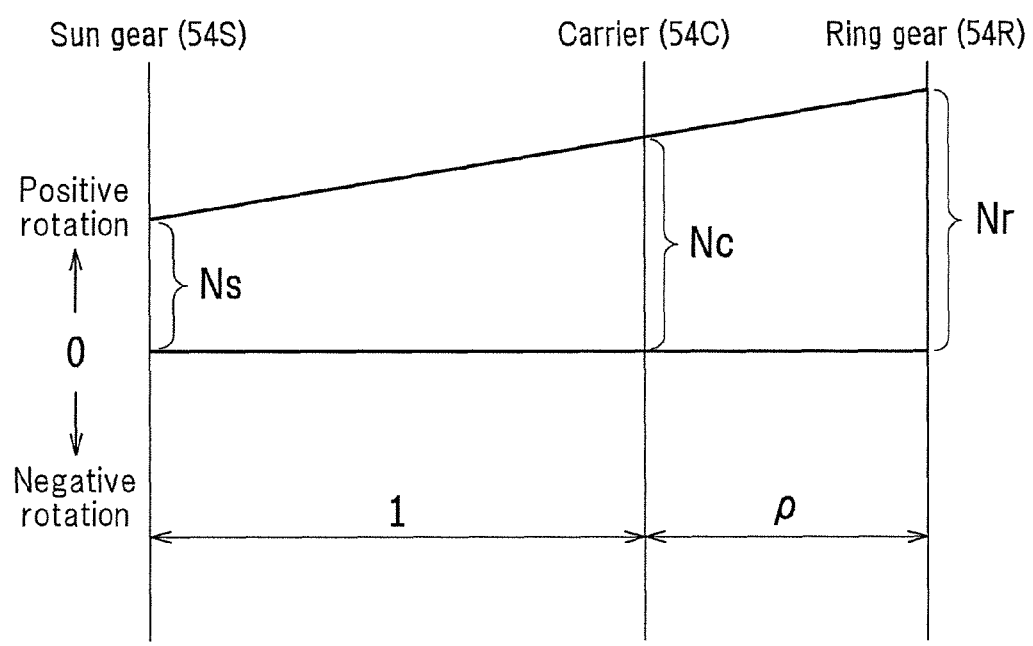
FIG. 5 is a nomogram showing one example of a traveling state to explain a power split mechanism of the hybrid vehicle of FIG. 4.

FIG. 5 is a nomogram that indicates the relationship among the sun gear 54S of the power split mechanism 54, the planetary carrier 54C and the ring gear 54R. FIG. 5 indicates one example thereof when the hybrid vehicle 200 travels.

The three longitudinal axes of the nomogram indicate, starting from the left, respective rotational speeds of the sun gear 54S, the planetary carrier 54C and the ring gear 54R. That is, Ns is the rotational speed of the sun gear 54S, Nc is the rotational speed of the planetary carrier 54C and Nr is the rotational speed of the ring gear 54R.

The axis that indicates the rotational speed of the planetary carrier 54C is located at the position where divides internally the distance between the axis indicating the rotational speed of the sun gear 54S and the axis indicating the rotational speed of the ring gear 54R at a ratio of 1:$\rho$. When the number of the teeth of the sun gear 54S is TNs and the number of the teeth of the ring gear 54R is TNr, $\rho$ is represented by the following formula.

$\rho = TNs/TNr$

Also, when the rotational speed of the generator 52 is Ng, the rotational speed of the engine 51 is Ne, the rotational speed of the motor 53 is Nm, and a speed reduction ratio of the reduction mechanism 55 (described herein after) is k, the following relationships are established.

$Ns = Ng$ $Nc = Ne$ $Nr = k \times Nm$

On the nomogram of the power split mechanism 54, a straight line is made by connecting the rotational speed Ns of the sun gear 54S, the rotational speed Nc of the planetary carrier 54C and the rotational speed Nr of the ring gear 54R. That is, when two of the three rotational speeds (Ns of the sun gear 54S, Nc of the planetary carrier 54C and Nr of the ring gear 54R) are determined, the rest is accordingly obtained. Specifically, the relationship below is established.

$Nc = \{\rho/(1+\rho)\} \times Ns + \{1/(1+\rho)\} \times Nr$

The reduction mechanism 55 is a mechanism to decelerate the rotation of the motor 53 and increase drive torque, which is, for example, a planetary gear mechanism.

Specifically, the reduction mechanism 55 includes: a sun gear 55S with outer teeth that rotates at a center of a plurality of gear elements; pinion gears 55P with outer teeth that are circumscribed with the sun gear 55S while rotating; and a ring gear 55R with inner teeth that is formed in a ring shape so as to engage with the pinion gears 55P.

The ring gear 55R of the reduction mechanism 55 and the ring gear 54R of the power split mechanism 54 are integrally formed. The sun gear 55S is integrally rotatably connected to the rotor 53a of the motor 53.

The hybrid vehicle 200 includes a hydraulic braking device 61 in a vicinity of each of the drive wheels 59. The braking device 61 is configured similarly to the above-described braking device 10.

—Electrical Configuration—

Next, a description will be given on an electrical configuration of the hybrid vehicle 200 according to the second embodiment with reference to FIGS. 4 and 6.

As shown in FIG. 4, the hybrid vehicle 200 includes the ECU 71, a battery 72 and inverters 73a and 73b.

The ECU 71 controls the hybrid vehicle 200. The ECU 71 controls traveling of the hybrid vehicle 200 by executing various types of control including, for example, operation control of the engine 51, drive control of the generator 52 and the motor 53, and cooperative control of the engine 51, the generator 52 and the motor 53. The ECU 71 is one example of the "control device" of the present invention.

Figure 6:
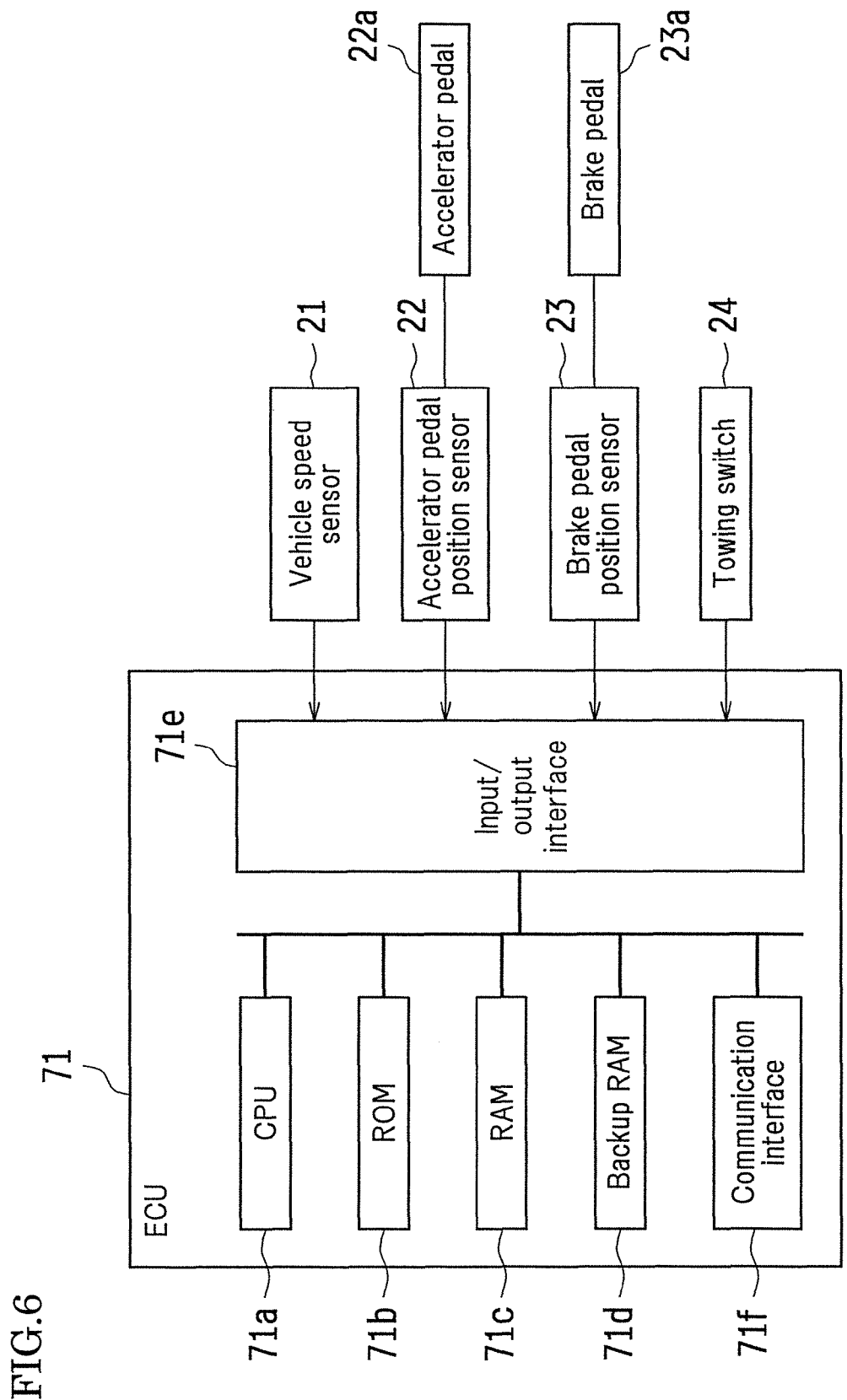
FIG. 6 is a block diagram showing the ECU of the hybrid vehicle of FIG. 4.

As shown in FIG. 6, the ECU 71 includes a CPU 71a, a ROM 71b, a RAM 71c, a backup RAM 71d, an input/output interface 71e and a communication interface 71f.

The CPU 71a executes calculation processing based on various control programs and maps stored in the ROM 71b. The ROM 71b stores the various control programs and the maps to be referred to when executing the various control programs. The RAM 71c is a memory for temporary storing calculation results by the CPU 71a and detection results by respective sensors. The backup RAM 71d is a nonvolatile memory for storing data to be stored when an ignition is turned off.

To the input/output interface 71e are input the detection results of the respective sensors. The input/output interface 71e also has a function to output control signals to respective units. Similarly to the first embodiment, to the input/output interface 71e are connected, for example, the vehicle speed sensor 21, the accelerator pedal position sensor 22, the brake pedal position sensor 23 and the towing switch 24.

The battery 72 (see FIG. 4) is configured similarly to the above-described battery 12. The battery 72 is one example of the "electricity storage device" of the present invention.

Each of the inverters 73a and 73b is, for example, a three-phase bridge circuit having an IGBT and a diode. The inverters 73a and 73b perform regenerative control or power running control in such a way that on/off of the IGBT is controlled according to a drive signal supplied from the ECU 71.

Specifically, the inverter 73a outputs direct current to the battery 72 by converting alternating current generated by the generator 52 using power of the engine 51 into direct current (generation control), and drives the generator 52 by converting direct current supplied from the battery 72 into alternating current (power running control).

The inverter 73b drives the motor 53 by converting direct current supplied from the battery 72 into alternating current (power running control). And when regenerative braking is carried out, the inverter 73b outputs direct current to the battery 72 by converting alternating current generated by the motor 53 into direct current (generation control).

—Traveling State—

Next, a description will be given on one example of the traveling state of the hybrid vehicle 200 according to the second embodiment.

For example, when the hybrid vehicle 200 is started or performs low-load traveling with a low vehicle speed, it travels by stopping the operation of the engine 51 and performing the power-running control of the motor 53 (EV traveling).

Also, when the hybrid vehicle 200 normally travels, it travels using the engine 51 as a main power source. The hybrid vehicle 200 also performs the generation control of the generator 52 and performs subsidiarily the power-running control of the motor 53 using electric energy obtained by the generation control.

Also, when the hybrid vehicle 200 is accelerated, it travels by driving the engine 51 and performing the power-running control of the motor 53 using electric energy obtained by the generation control of the generator 52 and electric energy of the battery 72.

Thus, in the hybrid vehicle 200, an intermittent operation of the engine 51 can be performed according to the traveling state and the like.

—Operations at Time of Deceleration Braking when Vehicle Travels—

Figure 7:
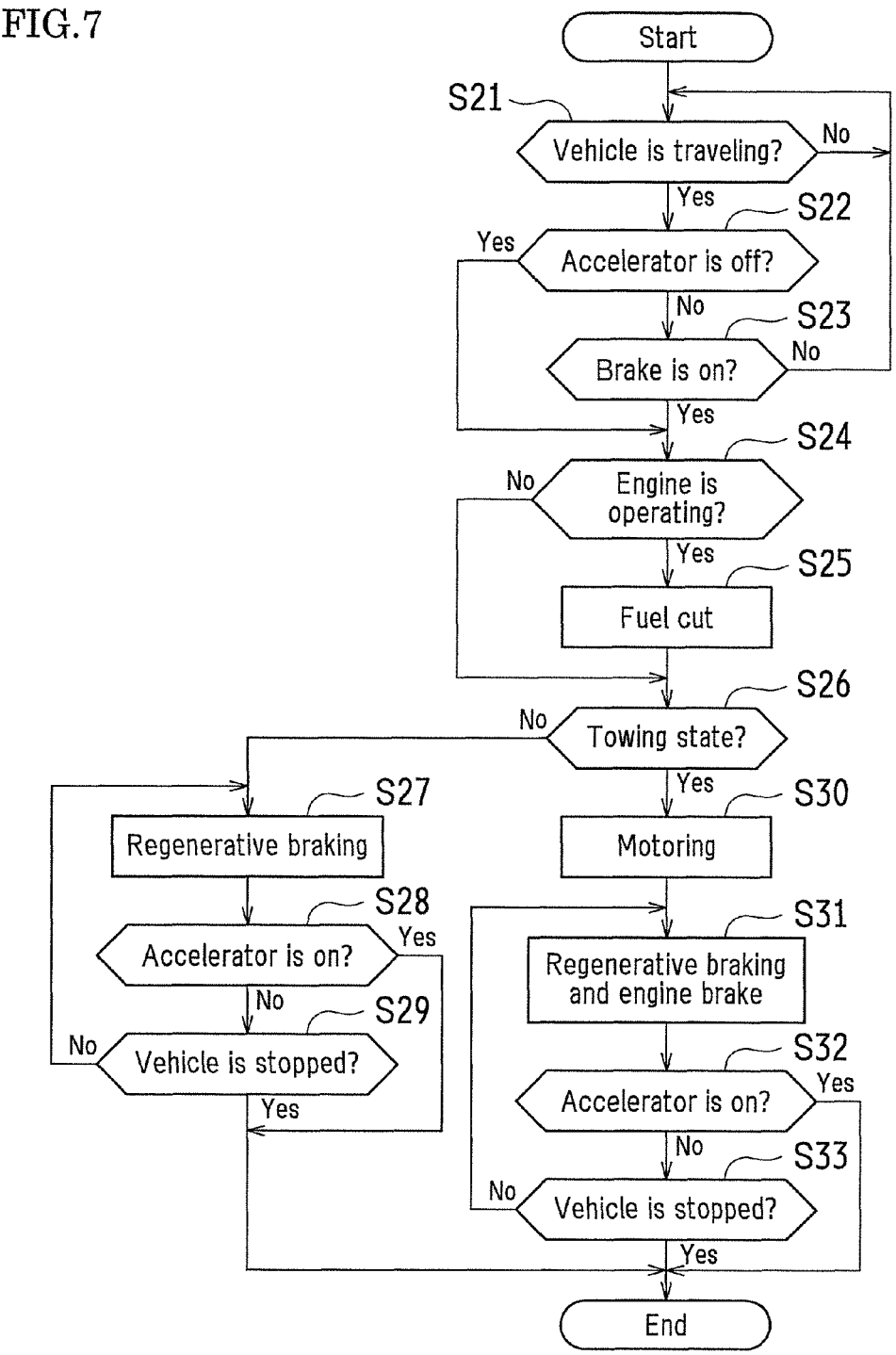
FIG. 7 is a flowchart explaining operations at the time of deceleration braking when the hybrid vehicle of FIG. 4 travels.

Next, a description will be given, with reference to FIG. 7, on operations of the hybrid vehicle 200 at the time of deceleration braking when the hybrid vehicle 200 travels according to the second embodiment. A series of operations described below is repeatedly performed while the vehicle system is active. Also, respective steps described below are executed by the ECU 71. Steps S21-S23 will not be described here because they are the same, respectively, as the above-described steps S1-S3.

In step S24, it is determined whether the engine 51 is being operated or not. If it is determined that the engine 51 is being operated, the procedure advances to step S25. On the other hand, if it is determined that the engine 51 is being stopped, the procedure advances to step S26.

In step S25, fuel supply to the engine 51 is stopped (fuel cut). In this way, a self-sustained operation of the engine 51 is stopped.

In step S26, it is determined whether the hybrid vehicle 200 is towing a towed object or not. Such a towing state is determined based on, for example, a signal from the towing switch 24. If it is determined that the hybrid vehicle 200 is not in the towing state (is in the normal state), the vehicle weight is in the reference state, thus the procedure advances to step S27. On the other hand, if it is determined that the hybrid vehicle 200 is in the towing state, the vehicle weight is greater than that in the reference state, thus the procedure advances to step S30.

Figure 8:
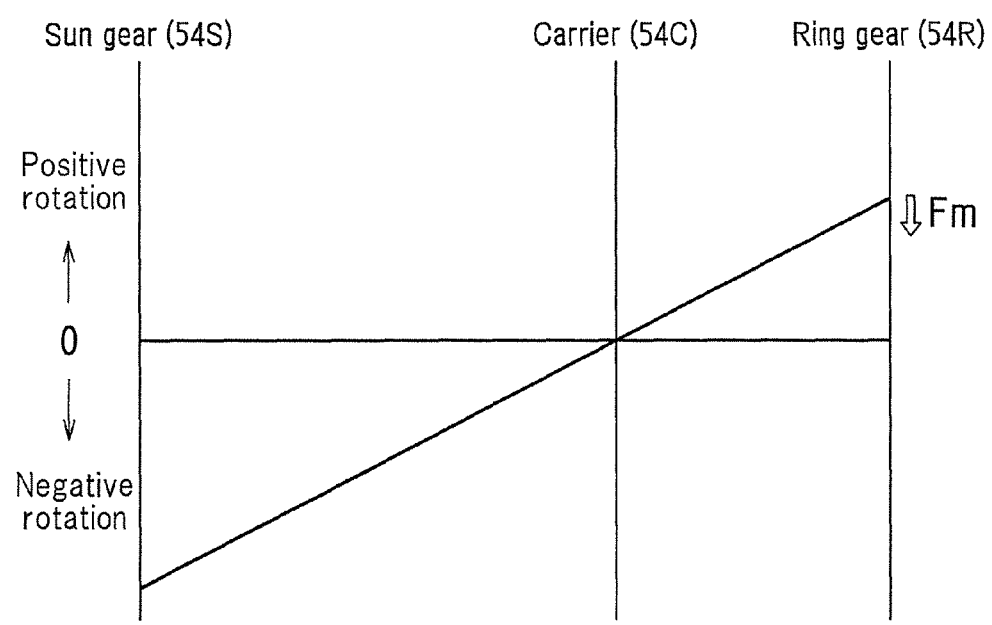
FIG. 8 is a nomogram showing a state of the hybrid vehicle of FIG. 4 at the time of regenerative braking.

When the hybrid vehicle 200 is in the normal state (is not in the towing state), the motor 53 is subjected to the regenerative control in step S27. Specifically, the motor 53 generates electric power under a condition in which the rotational speed of the engine 51 (the rotational speed of the planetary carrier 54C) is zero as shown in FIG. 8, thus a braking force Fm is output. At this time, since the generator 52 (sun gear 54S) is idling and the rotation of the engine 51 is being stopped, a braking force by engine brake is not generated. The generated electric power is converted from alternating current into direct current by the inverter 73b so as to be charged in the battery module of the buttery 72.

In step S28, it is determined whether the accelerator pedal 22a is on or not based on the detection result of the accelerator pedal position sensor 22. If it is determined that the accelerator pedal 22a is not on (the accelerator pedal 22a is in the off state), the procedure advances to step S29. On the other hand, if it is determined that the accelerator pedal 22a is on, the series of operations at the time of the deceleration braking is terminated.

In step S29, it is determined whether the traveling of the hybrid vehicle 100 is stopped or not based on the detection result of the vehicle speed sensor 21. If it is determined that the traveling is stopped, the series of operations at the time of the deceleration braking is terminated. On the other hand, if it is determined that the traveling is not stopped, the procedure returns to step S27.

Figure 9:
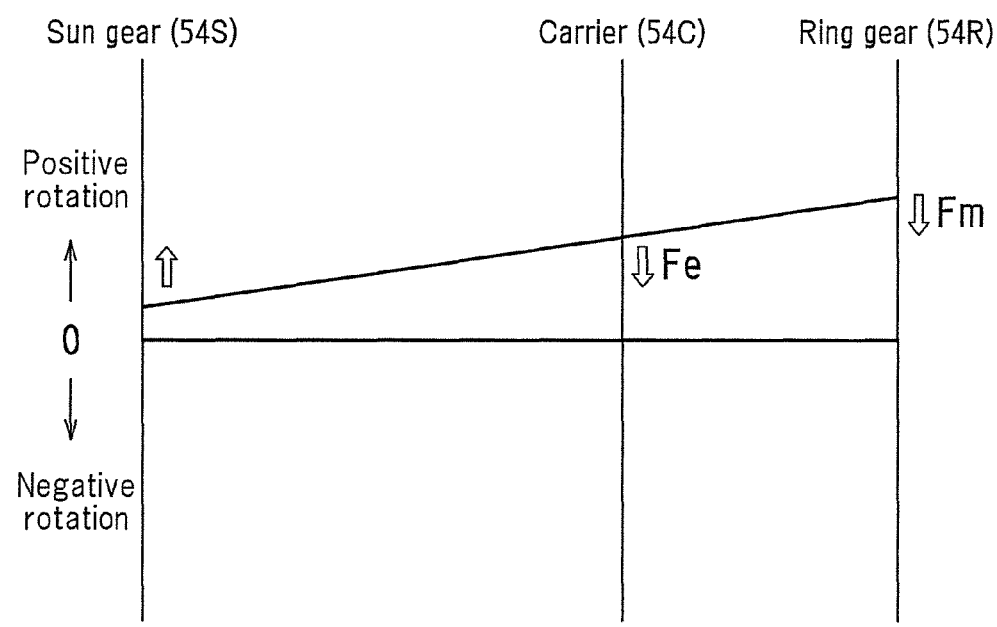
FIG. 9 is a nomogram showing a state of the hybrid vehicle of FIG. 4 at the time of regenerative braking and engine braking.

If the hybrid vehicle 200 is in the towing state, in step S30, motoring of the engine 51 is performed by the generator 52. For this reason, the rotational speed of the engine 51, which is decreasing toward zero due to stop of the self-sustained operation, is increased by the generator 52. Then, in step S31, the regenerative control of the motor 53 is performed and furthermore the motoring of the engine 51 is performed, thus, the engine brake functions. Here, when the motoring of the engine 51 is performed, the rotational speed of the engine 51, whose self-sustained operation is stopped, is increased (the rotation of the engine 51 is maintained) as shown in FIG. 9. Thus, a braking force by friction of the engine 51 is output to the ring gear 54R. That is, because of the vehicle weight greater than that in the reference state, when an inertial force is large at the time of the deceleration braking, the braking force Fe by the engine brake is output in addition to the regenerative braking force Fm by the motor 53. Note that the maximum value of the regenerative braking force by the motor 53 at this time may be smaller than the maximum value of the above-described regenerative braking force in step S27.

In step S32, it is determined whether the accelerator pedal 22a is on or not based on the detection result of the accelerator pedal position sensor 22. If it is determined that the accelerator pedal 22a is not on (the accelerator pedal 22a is in the off state), the procedure advances to step S33. On the other hand, if it is determined that the accelerator pedal 22a is on, the series of operations at the time of the deceleration braking is terminated.

In step S33, it is determined that the traveling of the hybrid vehicle 200 is stopped or not based on the detection result of the vehicle speed sensor 21. If it is determined that the traveling is stopped, the series of operations at the time of the deceleration braking is terminated. On the other hand, if it is determined that the traveling is not stopped, the procedure returns to step S31.

—Effects—

As described above, in the second embodiment, when a large braking force is required at the time of the deceleration braking because of the hybrid vehicle 200 being in the towing state and having the vehicle weight greater than that in the reference state, the braking force is generated by the engine brake while the regenerative braking force is generated by the motor 53, thus part of the required braking force can be borne by engine brake. In this way, a sufficient braking force can be obtained while the electric power generated by the motor 53 is prevented from reaching the input limit Win of the battery module of the battery 72. Thereby, even if the vehicle weight is great, it is possible to suppress degradation of drivability due to lack of the braking force.

Also, in the second embodiment, the motoring of engine 51 is performed by the generator 52. Thus, the braking force by the engine brake can be output.

The other effects of the second embodiment are the same as those of the above-described first embodiment.

Other Embodiments

The embodiments disclosed herein are in all respects merely illustrative and are not to be construed in limiting fashion. Therefore, the scope of the present invention is not to be construed in any way whatsoever by only the foregoing embodiments, but to be indicated by the claims. All modifications and changes within the range of equivalents of the claims are, moreover, within the scope of the present invention.

For example, in the first embodiment, the present invention is applied to the ECU 11 of the FR (front-engine rear-wheel drive) hybrid vehicle 100, and in the second embodiment, the present invention is applied to the ECU 71 of the FF (front-engine front-wheel drive) hybrid vehicle 200. However, the present invention is not limited thereto. The present invention may be applied to a control device for a 4WD (four wheel drive) hybrid vehicle.

Furthermore, in the first and second embodiments, the hybrid vehicle is in the towing state for showing one example of the vehicle weight greater than that in the reference state. However, the present invention is not limited thereto. It may be determined that the vehicle weight is greater than that in the reference state when cargo and the like is loaded. Also, it may be determined whether the vehicle weight is great or not based on the towing state and the loading state. It is possible to determine the loading state of the cargo and the like based on, for example, a determination result and the like of an acceleration sensor provided in the hybrid vehicle.

Also, in the first and second embodiments, an example is shown in which the towing state and the normal state can be switched by the operation by the driver. However, the present invention is not limited thereto. A sensor may be provided in the hybrid vehicle to detect whether a towed object is connected to the hybrid vehicle or not. The towing state and the normal state may be switched based on a detection result of the sensor.

In step S31 of the second embodiment, the braking force by the engine brake may be controlled based on the vehicle weight. For example, as the vehicle weight becomes greater, the braking force by the engine brake may get larger by increasing the rotational speed of the engine 51 to which the motoring is performed by the generator 52.

In the first and second embodiments, the ECU may be configured by a plurality of ECUs such as a HV (hybrid) ECU that totally controls the hybrid vehicle, a MG (motor generator) ECU that controls drive of the inverter, and an engine ECU that controls operations of the engine.

In the first and second embodiments, an example is shown in which the regenerative braking force and the braking force by the engine brake are output when the vehicle is in the towing state, and only the regenerative braking force is output when the vehicle is not in the towing state. However, the present invention is not limited thereto. The braking force by the engine brake may be mainly output when the vehicle is in the towing state, and the regenerative braking force may be mainly output when the vehicle is not in the towing state.

For example, only the braking force by the engine brake may be output when the vehicle is in the towing state, and only the regenerative braking force may be output when the vehicle is not in the towing state. Also, only the braking force by the engine brake may be output when the vehicle is in the towing state, and the regenerative braking force and the braking force by the engine brake may be output (mainly, the regenerative braking force is output) when the vehicle is not in the towing state.

Also, when the vehicle is in the towing state, the regenerative braking force and the braking force by the engine brake may be output, with the braking force by the engine brake having a higher ratio of the braking force. When the vehicle is not in the towing state, the regenerative braking force and the braking force by the engine brake may be output, with the regenerative braking force having a higher ratio of the braking force. When setting the proportion of the respective braking forces, the braking force by the engine brake can be adjusted by controlling the engaging state (half clutch state) of the clutch 2 in the first embodiment, and by controlling the rotational speed of the motor 53 in the second embodiment.

DESCRIPTION OF REFERENCE SIGNS

1 Engine
2 Clutch
3 Motor generator (first motor generator)
9 Drive wheels
11 ECU (Control device)
12 Battery (electricity storage device)
100 Hybrid vehicle (vehicle)
51 Engine
52 Generator (second motor generator)
53 Motor (first motor generator)
54 Power split mechanism
59 Drive wheels
71 ECU (Control device)
72 Battery (electricity storage device)
200 Hybrid vehicle (vehicle)

The invention claimed is:
1. A vehicle control device comprising:
an engine and a first motor generator from both of which a driving force for traveling is output to drive wheels;
a second motor generator that can perform motoring of the engine, the motoring of the engine is an increase in a rotational speed of the engine;
a power split mechanism that splits and transmits power of the engine to the second motor generator and the drive wheels; and
an electricity storage device that stores electric power for driving the first motor generator,
wherein, when a vehicle weight is in a reference state at a time of deceleration braking, at least the first motor generator is caused, out of the first motor generator and the engine, to generate a first braking force, and when the vehicle weight is greater than that in the reference state at the time of deceleration braking, at least the engine is caused, out of the first motor generator and the engine, to generate a second braking force,
when the vehicle weight is greater than that in the reference state, a portion of the second braking force by the first motor generator is less than a portion of the first braking force by the first motor generator when the vehicle weight is in the reference state,
wherein, when the vehicle weight is greater than that in the reference state, the motoring of the engine is performed by the second motor generator so as to generate at least a portion of the second braking force by engine brake.

2. The vehicle control device according to claim 1,
wherein a towing state of the vehicle is included where the vehicle weight is greater than that in the reference state, and
wherein a non-towing state of the vehicle is included where the vehicle weight is in the reference state.

* * * * *